(12) United States Patent
Kuo et al.

(10) Patent No.: US 8,669,920 B2
(45) Date of Patent: Mar. 11, 2014

(54) PIXEL ARRAY

(75) Inventors: Wei-Hung Kuo, Changhua County (TW); Tun-Chun Yang, Taipei (TW); Seok-Lyul Lee, Hsinchu (TW); Wei-Ming Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 372 days.

(21) Appl. No.: 12/779,954

(22) Filed: May 14, 2010

(65) Prior Publication Data
US 2011/0148743 A1 Jun. 23, 2011

(30) Foreign Application Priority Data
Dec. 23, 2009 (TW) ............................... 98144539 A (51) Int. Cl.
*G09G 3/20* (2006.01)
(52) U.S. Cl.
USPC .......................................... 345/55; 349/139
(58) Field of Classification Search
USPC .................. 345/36–43, 56, 55; 349/139, 142
See application file for complete search history.

(56) References Cited

U.S. PATENT DOCUMENTS

| | | | | |
|---|---|---|---|---|
| 5,321,535 | A | * | 6/1994 | Ukai et al. ...................... 349/85 |
| 7,518,688 | B2 | * | 4/2009 | Chen et al. ..................... 349/144 |
| 2004/0222999 | A1 | * | 11/2004 | Choi et al. ..................... 345/589 |
| 2008/0036951 | A1 | * | 2/2008 | Tsai et al. ...................... 349/110 |
| 2008/0062107 | A1 | * | 3/2008 | Su et al. .......................... 345/92 |
| 2009/0026969 | A1 | * | 1/2009 | Joo ............................. 315/169.3 |

FOREIGN PATENT DOCUMENTS

| | | |
|---|---|---|
| CN | 101055386 | 10/2007 |
| TW | M241688 | 8/2004 |

OTHER PUBLICATIONS

"First Office Action of China Counterpart Application", issued on Mar. 1, 2011, p. 1-p. 3.

* cited by examiner

*Primary Examiner* — Andrew Sasinowski
(74) *Attorney, Agent, or Firm* — Jianq Chyun IP Office (57) ABSTRACT

A pixel array including scan lines, data lines and pixels is provided. The data lines and the scan lines are intersected so as to define sub-pixel regions arranged in array. Each pixel is disposed in a pixel region including (m×n) sub-pixel regions, wherein m is a positive integral and n is a positive integral larger than one. Each pixel includes a plurality of sub-pixels, wherein each sub-pixel includes an active device, a pixel electrode and a storage capacitor. At least a portion of the storage capacitors of the sub-pixels within the same pixel is concentrically disposed in one of the sub-pixel regions.

15 Claims, 11 Drawing Sheets

PIXEL ARRAY

CROSS-REFERENCE TO RELATED APPLICATION

This application claims the priority benefit of Taiwan application serial no. 98144539, filed on Dec. 23, 2009. The entirety the above-mentioned patent application is hereby incorporated by reference herein and made a part of specification.

BACKGROUND OF THE INVENTION

1. Field of the Invention

The present invention is related to a pixel array, and more particular to a pixel array having storage capacitors.

2. Description of Related Art

With the rapid development and application of information technology, wireless mobile communication, and informational household appliances, a good number of informational products are now using a touch panel as an input device instead of a conventional input device such as a keyboard or a mouse, wherein a touch-sensing display has become one of the most popular products on the current market.

Generally, the touch panel is a panel with an additional film layer having the touch sensing capability formed thereon. However, the manufacturing process of this kind of plug-in type touch panel has an additional step of assembling the panel and the touch sensing film layer, and the touch sensing film layer leads to the decreasing of the transmittance of the touch panel and the increasing of the thickness of the touch panel. Hence, the touch sensing film layer additionally assembled on the panel is disadvantageous for the progress of the panel towards to the lightness, slimness, shortness and compactness.

Accordingly, the conventional technique develops an in-cell type touch panel, in which the touch sensing film layer is integrated within the panel. Currently, the in-cell type touch panels are generally categorized into resistance type, capacitance type, optical type, acoustic wave type, and magnetic type. In the in-cell resistance type touch panel, a plurality of touch sensing conductors are formed on the opposite substrate and the photo spacer, and a plurality of touch sensing pads are formed on the active device array substrate. When the user presses the opposite substrate, the touch sensing conductors on the photo spacer conducts the touch sensing pads on the active device array substrate to locate the position pressed by the user.

Figure 1A:
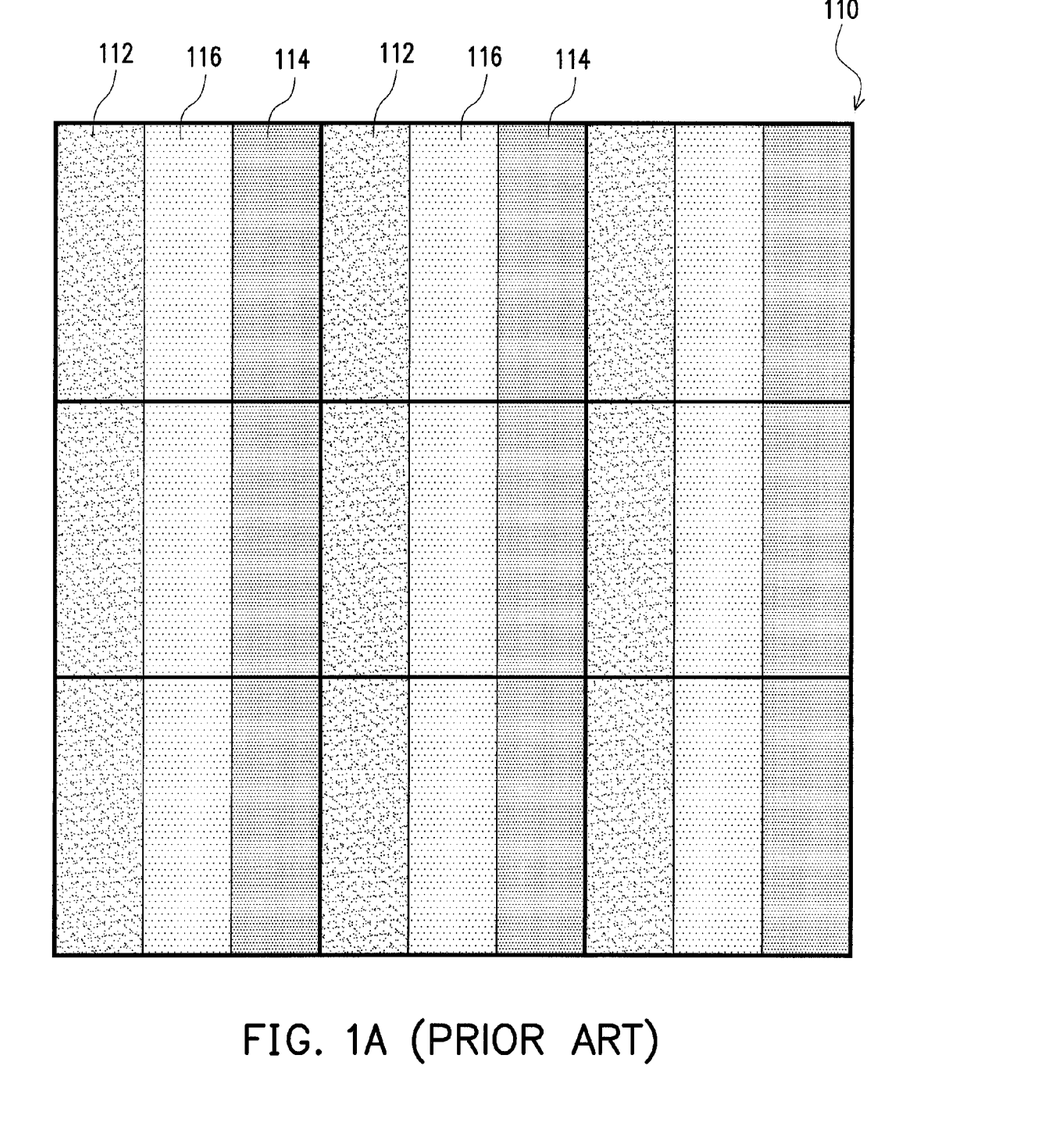
FIG. 1A is a top view showing a color filter of a conventional in-cell type touch panel.
Figure 1B:
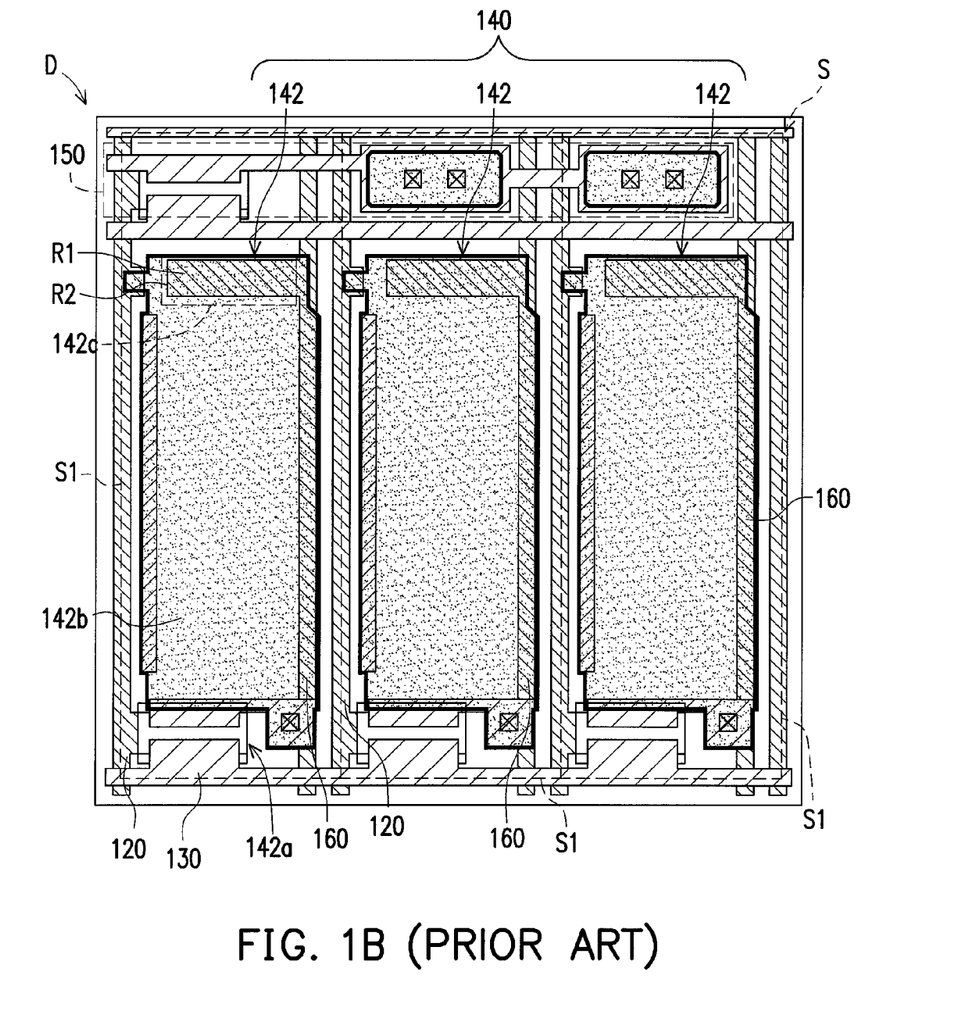
FIG. 1B is a top view showing an active device array substrate accompanying with the color filter shown in FIG. 1A.

FIG. 1A is a top view showing a color filter of a conventional in-cell type touch panel. FIG. 1B is a top view showing an active device array substrate accompanying with the color filter shown in FIG. 1A. As shown in FIG. 1A, in the conventional in-cell type touch panel, the red resins 112, the blue resin 114 and the green resins 116 for composing the color filter 110 are respectively arranged into stripes. In other words, the red resins 112 are arranged into several columns, the blue resins 114 are arranged into several columns, and the green resins 116 are arranged into several columns. Further, the resins with different colors are not arranged in the same column.

As shown in FIG. 1A together with FIG. 1B, in the conventional in-cell type touch panel, the active device array substrate D comprises a plurality of scan lines 120, a plurality of data lines 130, a plurality of pixels 140, a plurality of touch sensing units 150 and a plurality of common lines 160. The scan lines 120 intersect with the data lines 130 to define a plurality of sub-pixel regions S1 arranged in an array. Any three adjacent sub-pixel regions S1 together form a pixel region S. The pixels 140 are respectively located in the corresponding pixel regions S. Each of the pixels 140 has three sub-pixels 142, which are located in the three sub-pixel regions S1 of the pixel region S. In order to consist with the strip arrangement of the red resins 112, the blue resin 114 and the green resins 116 on the color filter 110, the sub-pixels 142 are arranged in strips.

More specifically, each of the sub-pixels 142 comprises an active device 142a, a pixel electrode 142b and a storage capacitor 142c. Each of the active devices 142a is connected between the corresponding pixel electrode 142b and the data line 130. The common lines 160 cross sub-pixel regions S1 in the same column and electrically connected to the storage capacitors 142c in the sub-pixel regions S1 in the same column. The common lines 160 are disposed under the peripheries of the pixel electrodes 142b and to overlap the pixel electrodes 142b. Moreover, each of the touch sensing units 150 is disposed in the corresponding pixel region S and crosses the three adjacent sub-pixel regions S1.

Each of the sub-pixel regions S1 has the storage capacitor 142c and each of the storage capacitors 142c has a capacitor upper electrode R1 and a capacitor bottom electrode R2. The capacitor upper electrode R1 is connected to the pixel electrode 142b and the capacitor bottom electrode R2 is connected to the common line 160. The capacitor bottom electrode R2 is disposed under the periphery of the pixel electrode 142b and to overlap the capacitor upper electrode R1. The capacitor bottom electrode R2 is an opaque metal layer. Since each of the sub-pixel regions S1 is configured with a storage capacitor 142c and the opaque capacitor bottom electrode R2 overlaps the periphery of the pixel electrode 142c, the aperture ratio of the pixel 140 is decreased.

Further, since it is necessary for the common lines 160 to connect the capacitor bottom electrode R2 of each of the storage capacitors 142c, the common lines 160 need to cross each of the sub-pixel regions S1. Hence, the common lines 160 shield each of the pixel electrodes 142b and the aperture ratio of the pixels 140 is decreased.

Moreover, in order to avoid the light leakage, it is necessary to form a black matrix on the pixel region S to shield the storage capacitors 142c and the common lines 160. Further, in order to ensure the shielding effect of the black matrix, the area of the black matrix should be larger than the total area of the storage capacitors 142c and the common lines 160. More specifically, in order to completely cover the common lines 160 and the storage capacitors 142c, the periphery of the pattern of the black matrix is arranged beyond the peripheries of the common lines 160 and the storage capacitors 142c. Hence, the larger the length of the peripheral regions of the common lines 160 or the capacitor bottom electrodes R2 of the storage capacitors 142c overlapping the pixel electrodes 142b is and the larger the area of the black matrix is, the smaller the aperture ratio of the pixel 140 is.

Since the conventional common lines 160 and the capacitor bottom electrodes R of the storage capacitors 142c are all disposed under the periphery of the pixel electrodes 142b, the peripheral regions of the common lines 160 or the capacitor bottom electrodes R2 of the storage capacitors 142c overlapping the pixel electrodes 142b is stripe type with an extremely large length. Thus, the area of the corresponding black matrix is relatively large and the black matrix over covers the pixel electrodes 142b. Hence, the aperture ratio is decreased.

SUMMARY OF THE INVENTION

The present invention provides a pixel array having a relatively high aperture ratio.

The present invention provides a pixel array including a plurality of scan lines, a plurality of data lines and a plurality of pixels. The data lines intersect with the scan lines to define a plurality of sub-pixel regions arranged in an array. Each of the pixels is disposed in a pixel region, and the pixel region is composed of m×n sub-pixel regions, wherein m is a positive integral and n is a positive integral larger than one. Each of the pixels comprises a plurality of sub-pixels, and each of the sub-pixels comprises an active device, a pixel electrode and a storage capacitor. At least a portion of the storage capacitors in the same pixel is concentrically disposed in one of the sub-pixel regions.

In one embodiment of the present invention, each of the pixels further comprises a touch sensing device, and the at least a portion of the storage capacitors and the touch sensing device in the same pixel are concentrically disposed in one of the sub-pixel regions. In one embodiment of the present invention, the areas of the sub-pixel regions are not identical to each other.

In one embodiment of the present invention, areas of the sub-pixel regions are substantially equal to each other.

In one embodiment of the present invention, the at least a portion of the storage capacitors and the active devices in the same pixel are concentrically disposed in one of the sub-pixel regions.

In one embodiment of the present invention, areas of the sub-pixel regions are substantially equal to each other.

In one embodiment of the present invention, the pixel array further comprises a plurality of common lines, wherein the common lines are electrically connected to the storage capacitors and the common lines are distributed within a portion of the sub-pixel regions.

In one embodiment of the present invention, each of the storage capacitors comprises a first capacitor electrode and a second capacitor electrode. The first capacitor electrode is connected to one of the common lines and the second capacitor electrode is disposed over the first capacitor electrode. The second capacitor electrode is connected to one of the pixel electrodes.

In one embodiment of the present invention, the sub-pixel regions in the same pixel region are arranged to be a (m×n) checkerboard arrangement.

In one embodiment of the present invention, m is equal to n and is equal to two.

In one embodiment of the present invention, the sub-pixel regions configured with the storage capacitors are reflective regions or black matrix shielding regions.

According to the above description, at least a portion of the storage capacitors in the same pixel is concentrically disposed in one sub-pixel region in the pixel region or at the periphery of the pixel region, and the pixel electrodes are disposed in other sub-pixel regions in the pixel region. Thus, the pixel electrodes can be prevented from being shielded by the storage capacitors and the aperture ratio can be increased.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 2A:
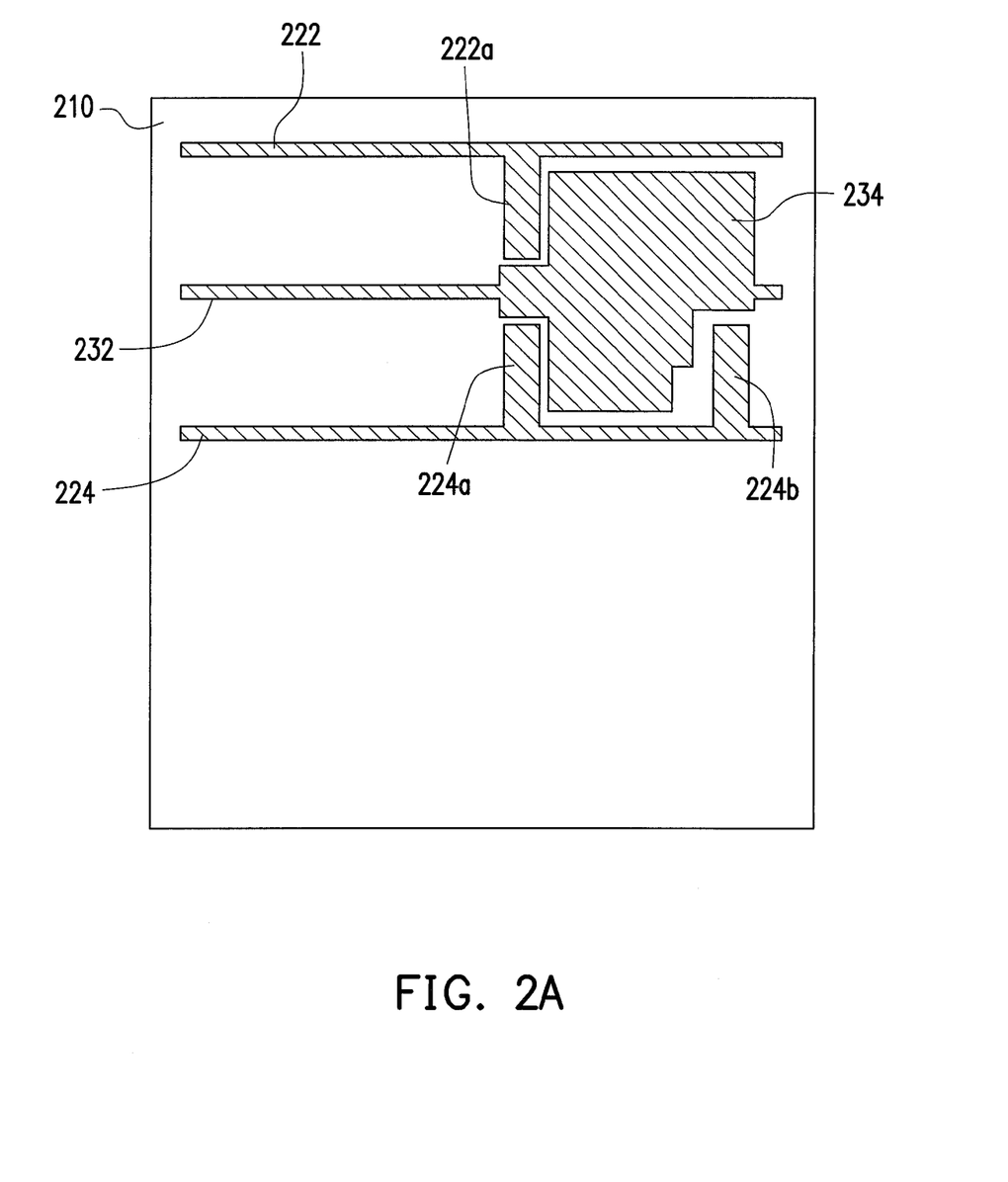
FIGS. 2A~2C are schematic top views showing a manufacturing process of a pixel array according to one embodiment of the invention.
Figure 2B:
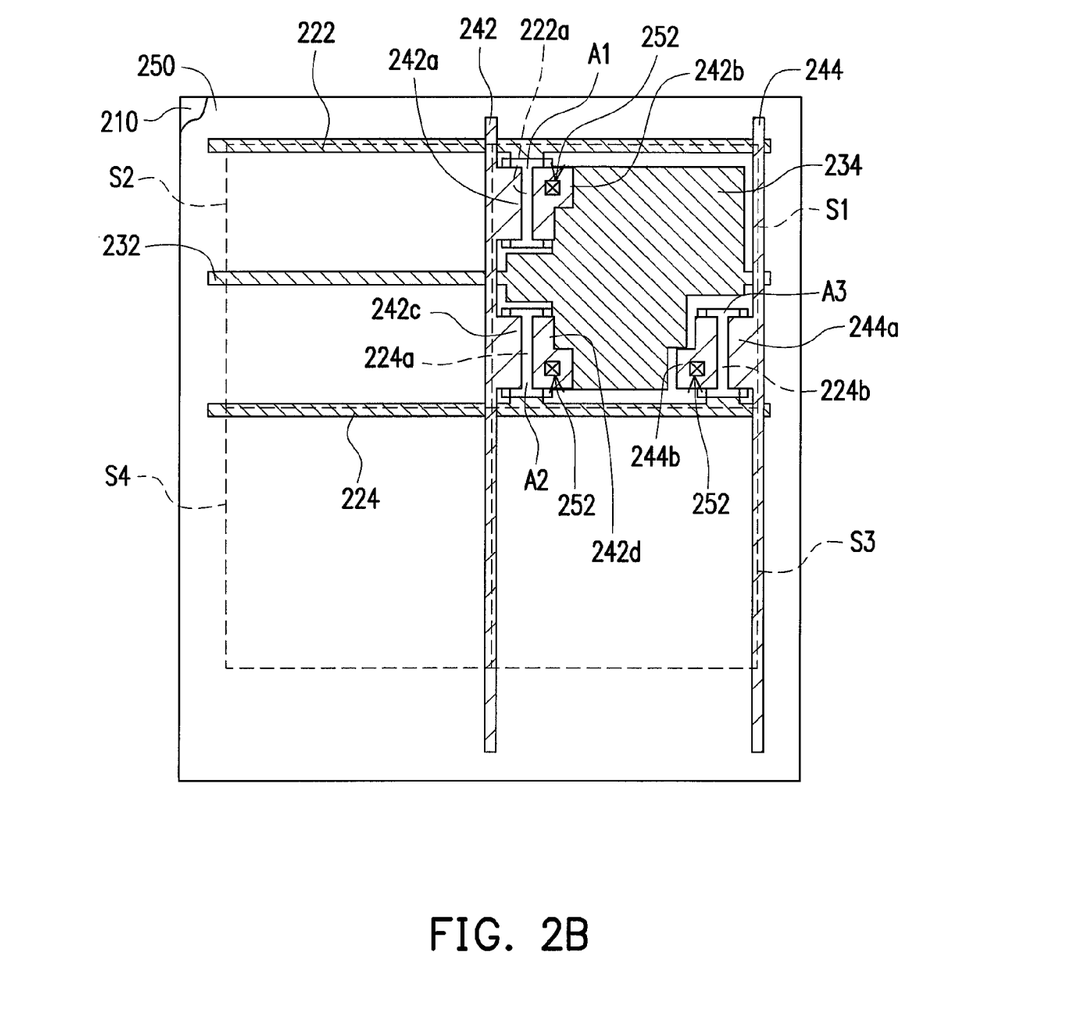
Figure 2C:
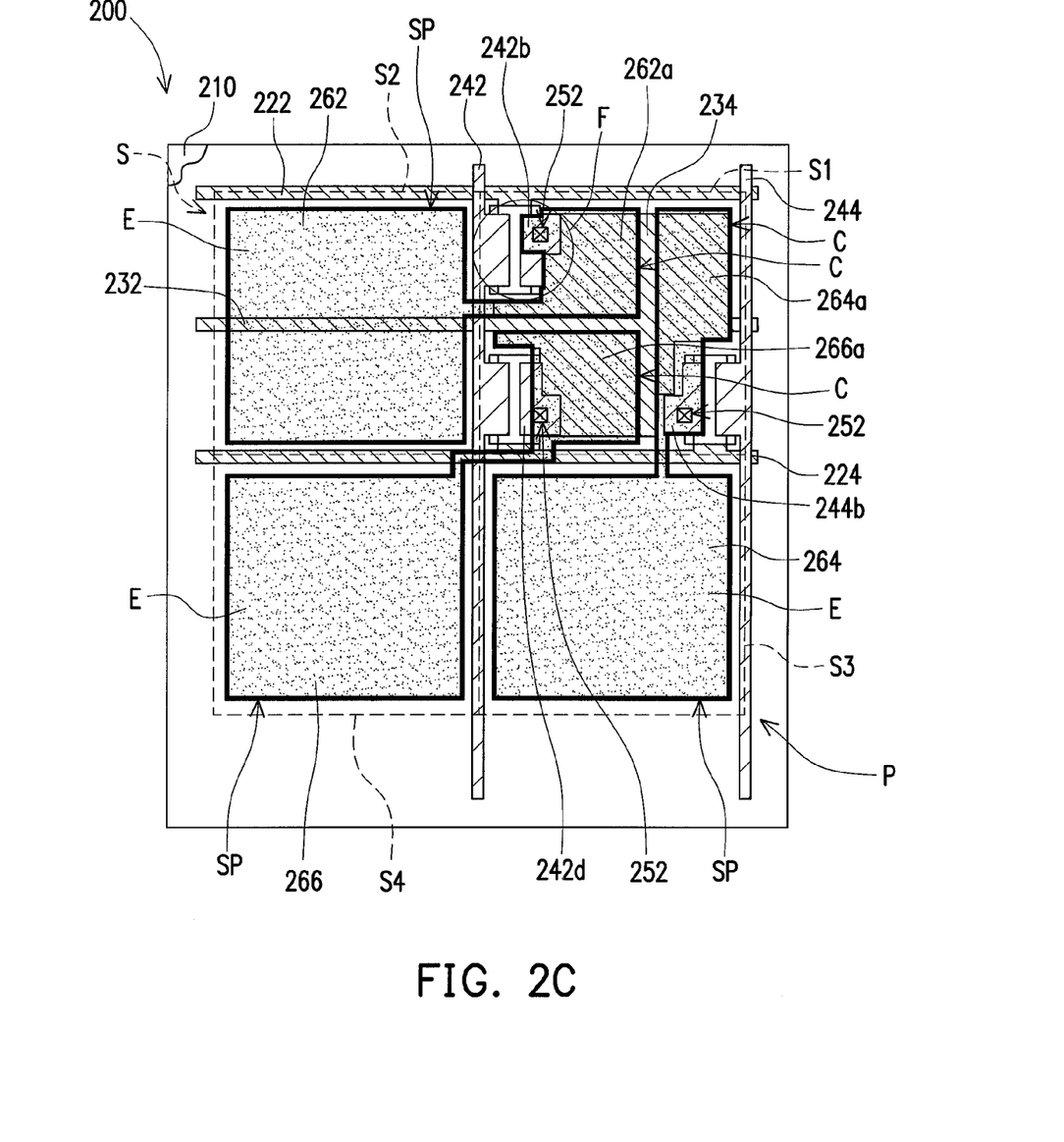

FIGS. 2A~2C are schematic top views showing a manufacturing process of a pixel array according to one embodiment of the invention.

It should be noticed that, in order to simplify the description, FIGS. 2A through 2C only show the process for manufacturing one pixel in the pixel array. Further, the descriptions related to FIGS. 2A through 2C only mention the process for manufacturing one pixel. However, the number of the pixels of the present invention is not limited by the drawings and the descriptions herein. That is, the pixel array of the present invention can has a plurality of pixels and the pixels can be formed by the manufacturing process shown in FIGS. 2A through 2C.

As shown in FIG. 2A, a substrate 210 is provided. Scan lines 222 and 224 parallel to each other are formed on the substrate 210. Further, a common line 232 and a first capacitor electrode 234, which are between the scan lines 222 and 224, are formed on the substrate 210 as well. The scan line 222 has a first gate electrode 222a towards the scan line 224, and the scan line 224 has a second gate electrode 224a and a third gate electrode 224b both towards the scan line 222.

In this embodiment, the first capacitor electrode 234 is adjacent to the first gate electrode 222a, the second gate electrode 224a and the third gate electrode 224b. The common line 232 is connected to the first capacitor electrode 234 and can be selectively arranged to be parallel to the scan line 222 (or scan line 224). In the present embodiment, the common line 232 and the first capacitor electrode 234 are formed in the same thin film process. Also, the common line 232 and the first capacitor electrode are made of the same material.

As shown in FIG. 2B, a plurality of active layers A1, A2 and A3 are formed to cover the first gate electrode 222a, the second gate electrode 224a and the third gate electrode 224b. Then, data lines 242 and 244 parallel to each other are formed on the substrate 210, and the date lines 242 and 244 intersect with the scan lines 222 and 224 to define a plurality of sub-pixel regions S1, S2, S3 and S4 arranged in an array. In the present embodiment, the first capacitor electrode 234 is located in the sub-pixel region S1, and the common line 232 extends from the sub-pixel region S1 to the sub-pixel region S2.

The data line 242 has a first source 242a, a first drain 242b, a second source 242c and a second drain 242d. The first source 242a and the first drain 242b cover a portion of the active layer A1 and overlap a portion of the first gate electrode 222a. The second source 242c and the second drain 242d cover a portion of the active layer A2 and overlap a portion of the second gate electrode 224a. The data line 244 has a third source 244a and a third drain 244b. Third source 244a and the third drain 244b cover a portion of the active layer A3 and overlap a portion of the third gate electrode 224b.

Then, an insulating layer 250 is entirely formed over the substrate 210 and the insulating layer 250 has a plurality of contact windows 252 exposing a portion of the first drain 242b, the second drain 242d and the third drain 244b respectively.

As shown in FIG. 2C, a plurality of transparent conductive layers 262, 264 and 266 are formed on the substrate 210. The transparent conductive layer 262 is located in the sub-pixel region S2 and extends into the sub-pixel region S1 so as to electrically connect the first drain 242b through the contact window 252. Further, the transparent conductive layer 262 has a second capacitor electrode 262a overlapping the first capacitor electrode 234. The transparent conductive layer 264 is located in the sub-pixel region S3 and extends into the sub-pixel region S1 so as to electrically connect the third drain 244b through the contact window 252. Further, the transparent conductive layer 264 has a second capacitor electrode 264a overlapping the first capacitor electrode 234. The transparent conductive layer 266 is located in the sub-pixel region S4 and extends into the sub-pixel region S1 so as to electrically connect the second drain 242d through the contact window 252. Further, the transparent conductive layer 266 has a second capacitor electrode 266a overlapping the first capacitor electrode 234. Therefore, the pixel array 200 of the present embodiment is initially formed.

The components included in pixel array 200 and the arrangement relationships between the components are detailed in the following descriptions.

As shown in FIG. 2c, the pixel array 200 of the present embodiment comprises a plurality of scan lines 222 and 224, a plurality of data lines 242 and 244 and a plurality of pixels P. The data lines 242 and 244 intersect with the scan lines 222 and 224 to define a plurality of sub-pixel regions S1, S2, S3 and S4 arranged in an array. In the present embodiment, areas of the sub-pixel regions S1, S2, S3 and S4 are substantially equal to each other.

Each of the pixels P is disposed in a pixel region S which is composed of m×n sub-pixel regions S1, S2, S3 and S4, wherein m is a positive integral and n is a positive integral larger than one. In the present embodiment, m is equal to n and is equal to two. However, the present invention is not limited thereto. In the present embodiment, the sub-pixel regions S1, S2, S3 and S4 in the same pixel region S are arranged to be a (m×n) checkerboard arrangement.

Each of the pixels P comprises a plurality of sub-pixels SP, and each of the sub-pixels SP comprises an active device F, a pixel electrode E and a storage capacitor C. The storage capacitors C in the same pixel P are concentrically disposed in the sub-pixel region S1, and the sub-pixel region S1 having the storage capacitors C disposed therein can be a reflective region or a black matrix shielding region. Moreover, in the present embodiment, the active devices F in the same pixel P can be selectively concentrically disposed in the sub-pixel region S1. Also, the pixel electrodes E in each of the pixels P can be selectively disposed in the sub-pixel regions S2, S3 and S4.

It should be noticed that, in the same pixel P, the opaque storage capacitors C are concentrically disposed in the sub-pixel region S1, and the pixel electrodes E are selectively disposed in the sub-pixel regions S2, S3 and S4. In other words, in the present embodiment, the opaque components (such as the storage capacitors C) in the same pixel P are gathered together so as to increase the aperture ratio.

Moreover, when the sub-pixel region S1 is a black matrix shielding region, the black matrix (not shown) used to shield the storage capacitors C only needs to be formed on the sub-pixel region S1 without shielding the pixel electrodes E in other pixel regions S2, S3 and S3. Thus, the aperture ratio is further increased.

In addition, comparing with the conventional arrangement in which the storage capacitors 142c should arranged along the peripheries of the pixel electrodes 142b leads to large peripheral length of the overlapping region of the capacitor bottom electrode R2 and the pixel electrodes 142b (as shown in FIG. 1B), the storage capacitors C of the present embodiment are concentrically disposed in the sub-pixel region S1 so as to greatly decrease the length of the joint portion between the storage capacitors C and the pixel electrodes E. Thus, the area of the black matrix is decreased and the aperture ratio is increased.

Moreover, in the present embodiment, the pixel array 200 can comprise a plurality of common lines 232, and each of the pixel regions S can be crossed over by one of common lines 232. The capacitors C of each of pixels P can be electrically connected to the corresponding common line 232. Herein, the so-called corresponding common line 232 is the common line 232 which is located in the same pixel region S with the aforementioned pixel P.

More specifically, in the present embodiment, each of the storage capacitors C comprises a first capacitor electrode 234 and a second capacitor electrode 262a (or the second capacitor electrode 264a and 266a). The first capacitor electrode 234 is connected to the common line 232. The second capacitor electrode 262a (or the second capacitor electrode 264a and 266a) is disposed over the first capacitor electrode 234. The second capacitor electrode 262a (or the second capacitor electrode 264a and 266a) is connected to the pixel electrode E.

It should be noticed that, in the present embodiment, the common line 232 is only distributed in the sub-pixel regions S1 and S2. That is, the common line 232 only overlaps the pixel electrode E located in the sub-pixel region S2 and does not overlap the pixel electrodes E located in the sub-pixel regions S3 and S4. Thus, all of the pixel electrodes E located in the sub-pixel regions S3 and S4 can be used to display the image. Hence, the shielding area of the pixel electrodes E in the pixel P shielded by the common line 232 can be decreased, and the area of the black matrix for shielding the common line 232 is decreased as well. Therefore, the aperture ratio is increased.

In the present embodiment, when the pixel array 200 is applied to the liquid crystal display panel (not shown), the aperture ratio of the aforementioned display panel is increased for about 18%.

Figure 3:
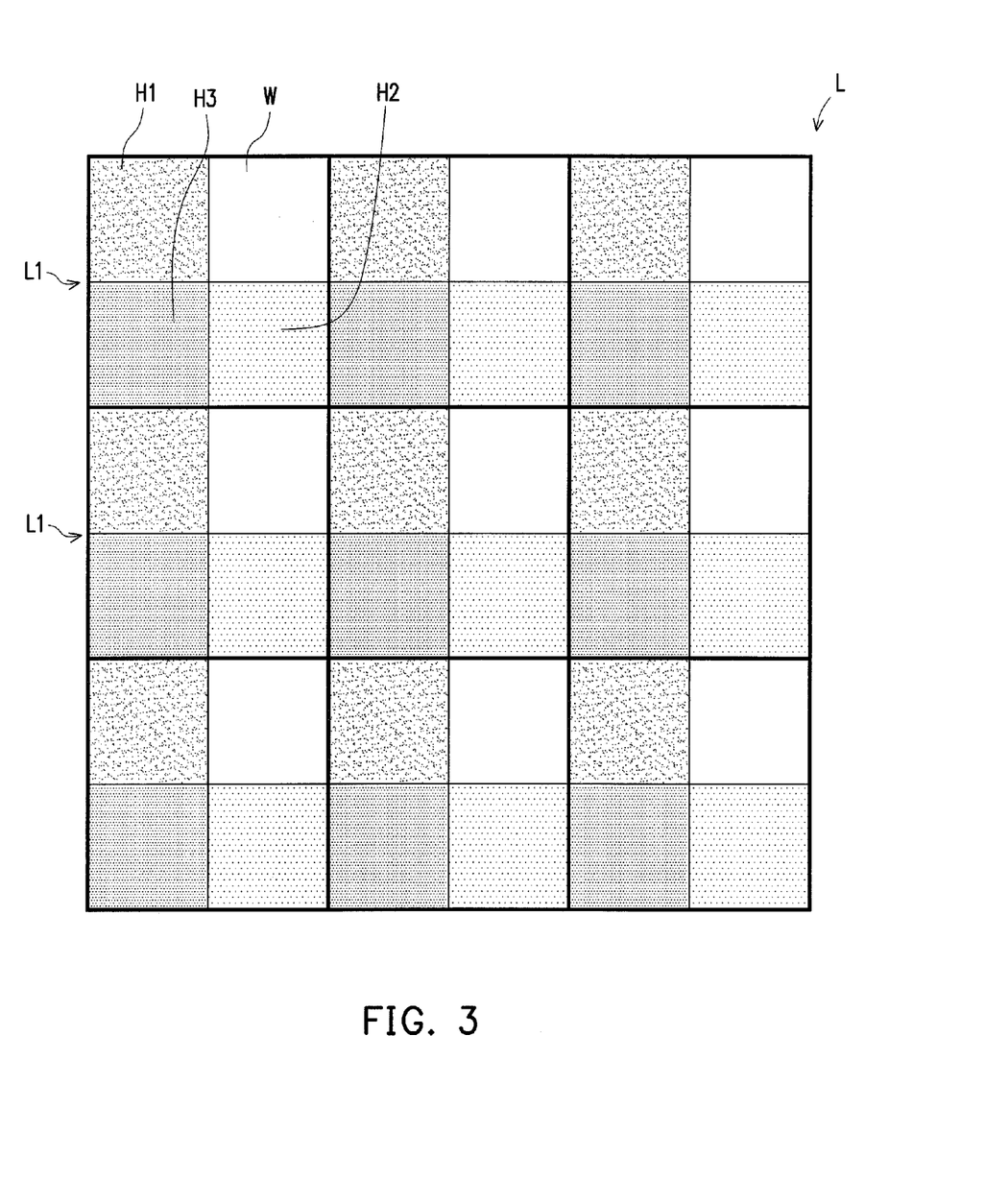
FIG. 3 is a schematic top view of a color filter according to one embodiment of the present invention.

FIG. 3 is a schematic top view of a color filter according to one embodiment of the present invention. As shown in FIG. 3, in the present embodiment, a color filter L is used with the pixel array 200 shown in FIG. 2C. More specifically, the color filter L comprises a plurality of regions L1 arranged in a checkerboard arrangement. Each of the regions L1 is configured with a blank region W, a first color region H1, a second color region H2 and a third color region H3. The location of the pixel region S of the pixel array 200 is correspondent with the locations of the regions L1 of the color filter L. The locations of the sub-pixel regions S1, S2, S3 and S4 of each of the pixel region S respectively correspond to the locations of the blank region W, the first color region H1, the second color region H2 and the third color region H3.

The first color region H1, the second color region H2 and the third color region H3 can be red, blue and green respectively. The blank region W can be a transparent region or a black region. When the blank region W is a transparent region, the sub-pixel region S1 in which the storage capacitors C are located can be a reflective region. When the blank region W is a black region, the sub-pixel region S1 in which the storage capacitors C are located can be a black matrix shielding regions.

A pixel array for being applied in a touch panel according to one embodiment of the present invention is detailed in the following descriptions.

Figure 4:
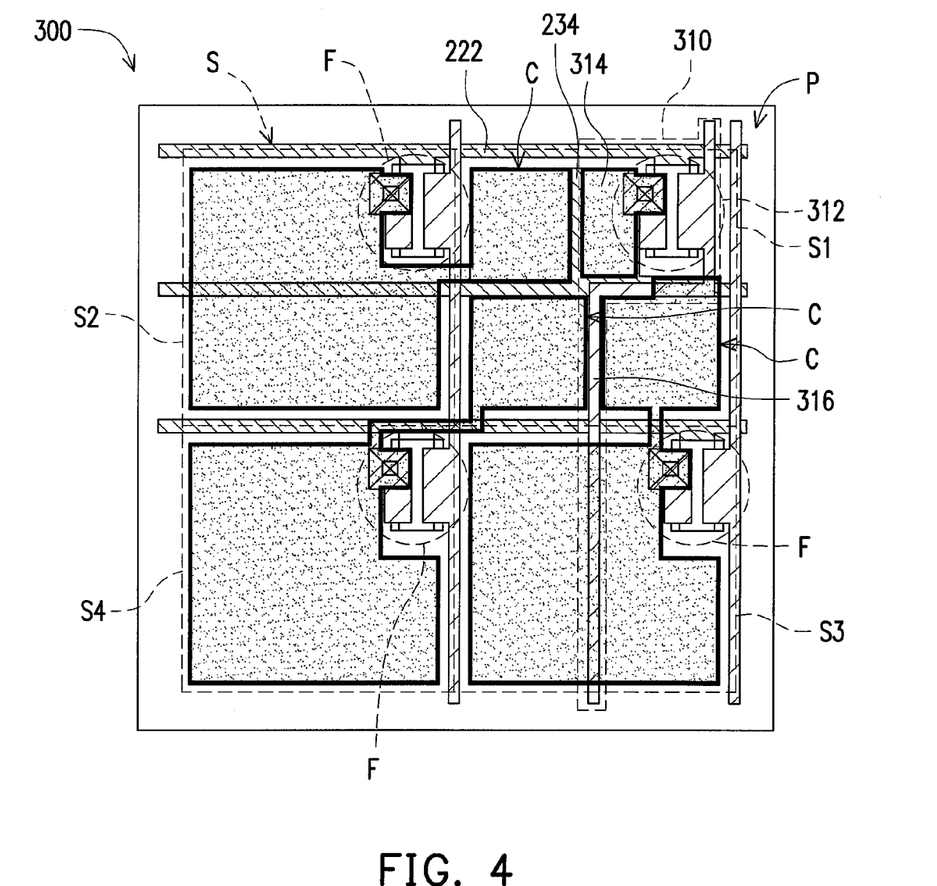
FIG. 4 is a schematic top view of pixel array for being applied in a touch panel according to one embodiment of the present invention.

FIG. 4 is a schematic top view of pixel array for being applied in a touch panel according to one embodiment of the present invention. As shown in FIG. 4, the pixel array 300 of the present embodiment is similar to the pixel array 200 shown in FIG. 2C. The difference between the pixel array 300 and the pixel array 200 is that the pixel array 300 further comprises a touch sensing device 310, and the storage capacitors C in the same pixel P and most portion of the touch sensing device 310 are concentrically disposed in the sub-pixel region S1 of the pixel region S. Further, the active devices F in the same pixel P can selectively disposed in the sub-pixel regions S2, S3 and S4.

More specifically, the touch sensing device 310 comprises an active device 312, a touch sensing pad 314 and a touch sensing data transmission line 316. The active device 312 is electrically connected to the scan line 222. The active device 312 is electrically connected to the touch sensing pad 314 and the touch sensing data transmission line 316. When the user presses the opposite substrate of the touch panel, touch sensing conductors on the photo spacer directly or indirectly contact the touch sensing pad 314 so as to change the voltage level of the touch sensing pad 314. When the scan line 222 electrically connected to the active device 312 receives a turn-on voltage to turn on the active device 312, the change of the voltage level of the touch sensing pad 314 can be detected by the touch sensing chip (not shown) through the touch sensing data transmission line 316. Hence, the touch sensing chip can determines the location on which the user presses. In the present embodiment, the touch sensing pad 316 can be selectively disposed on the first capacitor electrode 234.

In the present embodiment, when the pixel array 300 is applied to the touch panel (not shown), the aperture ratio of the aforementioned touch panel is increased for about 12%.

Moreover, a pixel array for being applied in a touch panel according to another embodiment of the present invention is detailed in the following descriptions.

FIGS. 5A~5D are a schematic top view showing a manufacturing process of a pixel array applied in a touch panel according to another embodiment of the present invention. In order to simplify the description, FIGS. 5A through 5D only show the process for manufacturing one pixel in the pixel array. Further, the descriptions related to FIGS. 5A through 5D only mention the process for manufacturing one pixel. However, the number of the pixels of the present invention is not limited by the drawings and the descriptions herein.

Figure 5A:
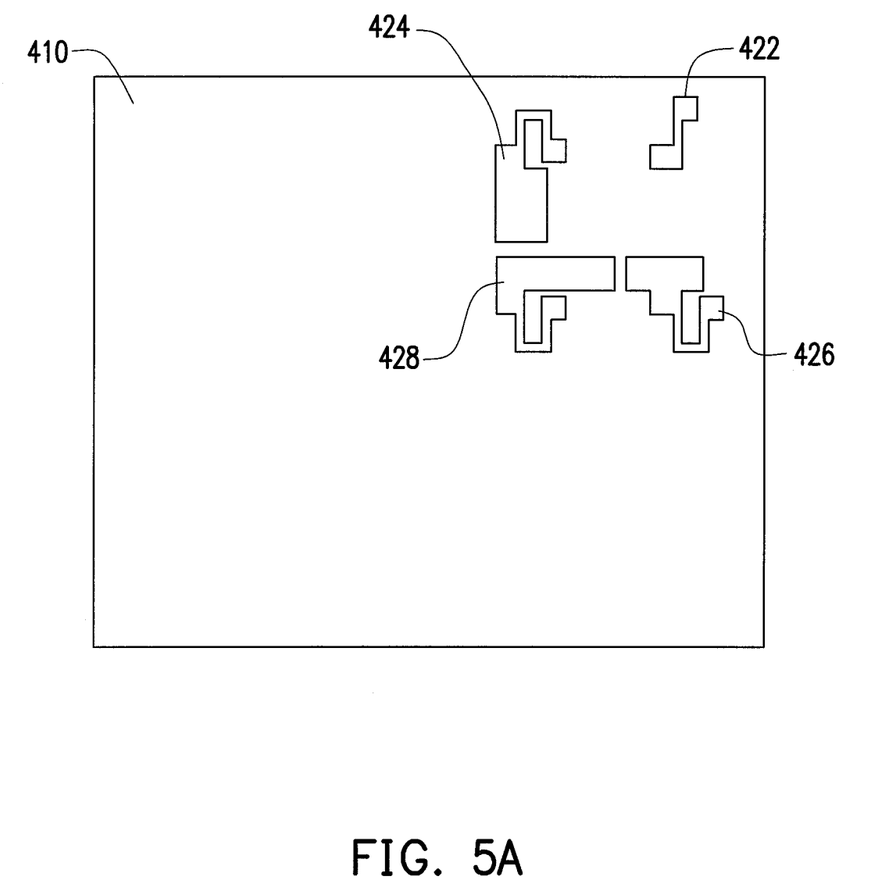
FIGS. 5A~5D are a schematic top view showing a manufacturing process of a pixel array applied in a touch panel according to another embodiment of the present invention.

As shown in FIG. 5A, a substrate 410 is provided. A plurality of active layers 422, 424, 426 and 428 are formed on the substrate. The material of the active layers 422, 424, 426 and 428 includes low temperature poly-silicon (LTPS).

Figure 5B:
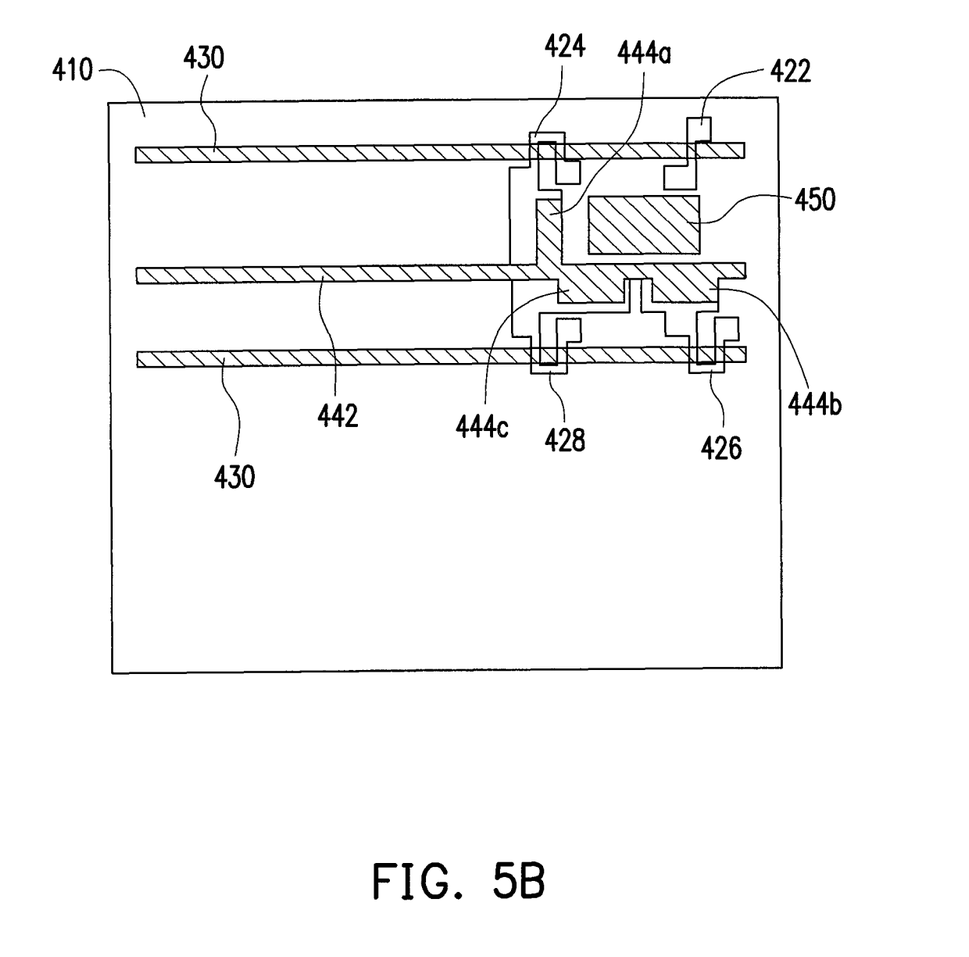

As shown in FIG. 5B, a plurality of scan lines 430 parallel to each other are formed on the substrate 410, and a common line 422 and a plurality of first capacitor electrodes 444a, 444b and 444c and a pad layer 450 are formed between the scan lines 430. The common line 422 and the first capacitor electrodes 444a, 444b and 444c are made of the same material and are connected to one another. The common line 442 is substantially parallel to the scan lines 430. The first capacitor electrodes 444a, 444b and 444c overlap the active layers 424, 426 and 428 respectively. The pad layer 450 is close to the active layer 422. All of the active layers 422, 424, 426 and 428 intersect with the scan lines 430.

Figure 5C:
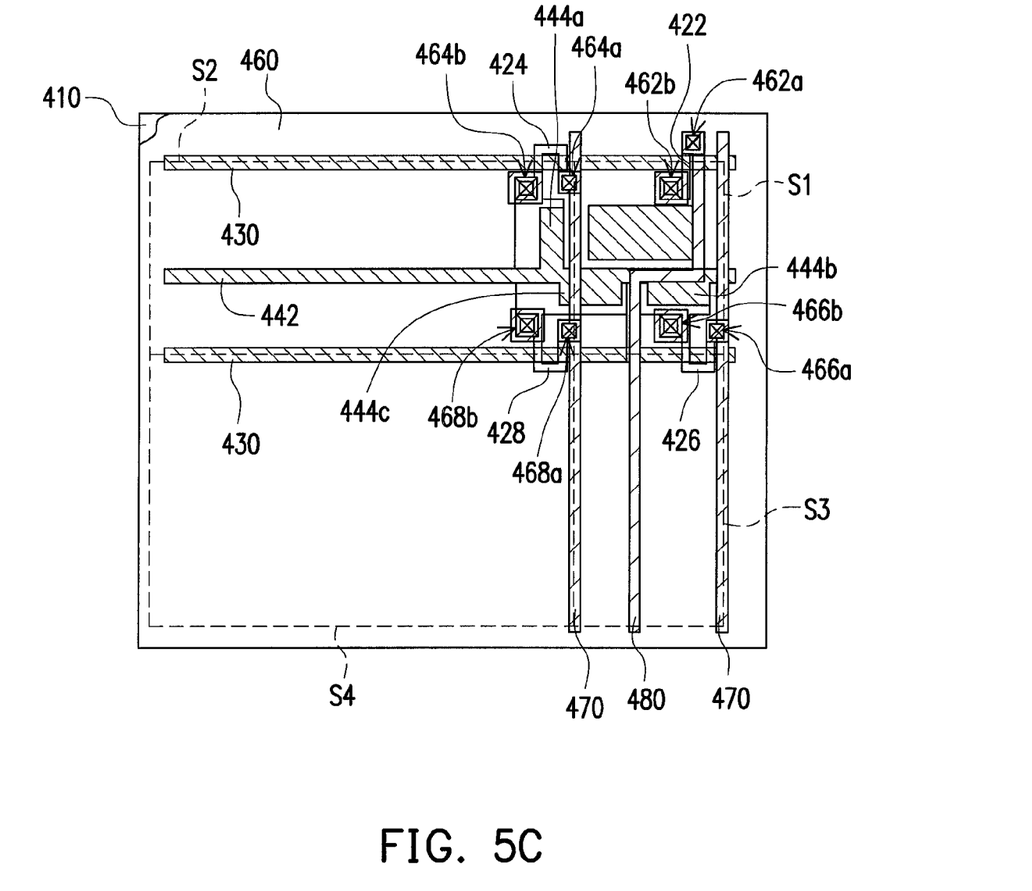

As shown in FIG. 5C, an insulating layer 460 is formed on the substrate 410 and has a plurality of contact windows 462a, 462b, 464a, 464b, 466a, 466b, 468a and 468b exposing portions of the active layers 422, 424, 426 and 428.

Then, a plurality of data lines 470 and a touch sensing data transmission line 480 are formed on the substrate 410. The data lines 470 intersect with the scan lines 430 to define a plurality of sub-pixel regions S1, S2, S3 and S4 arranged in an array. The areas of the sub-pixel regions S1, S2, S3 and S4 are not identical to one another.

In the present embodiment, the first capacitor electrode 444b is located in the sub-pixel region S1 and the first capacitor electrode 444a is located at the periphery of the sub-pixel region S1. The first capacitor electrode 444c crosses the sub-pixel regions S1 and S2, and the common line 442 extends from the sub-pixel region S1 into the sub-pixel region S2.

The data lines 470 are electrically connected to the active layers 424, 426 and 428 through the contact windows 464a, 464b, 466a, 466b, 468a and 468b respectively. The touch sensing data transmission line 480 is located between two adjacent data lines 470 and is electrically connected to the active layer 422 through the contact windows 462a and 462b.

Thereafter, a protective layer (not shown) and a flat layer (not shown) are formed on the substrate 410 in sequence. The protective layer and the flat layer have a plurality of contact windows penetrating through the protective layer and the flat layer. The contact windows are located over the contact windows 462b, 464b, 466b and 468b respectively to expose a portion of the date lines 470.

Figure 5D:
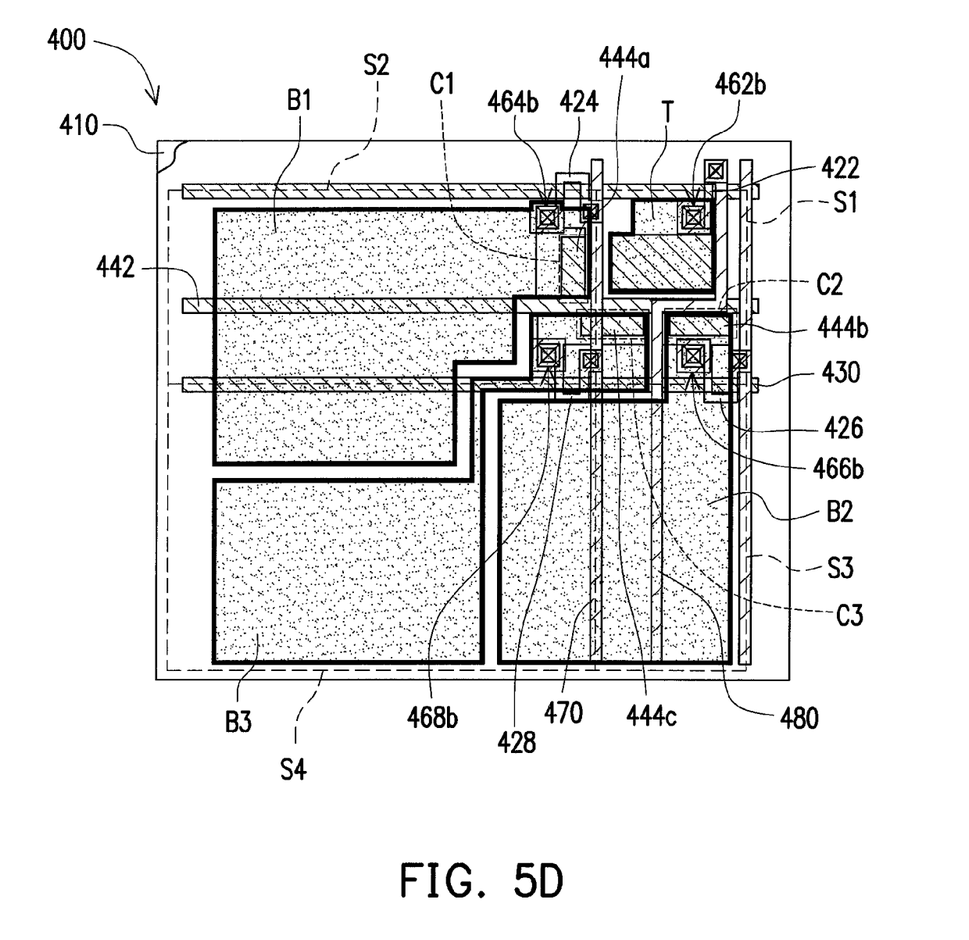

As shown in FIG. 5D, a plurality of transparent conductive layer B1, B2 and B3 and a touch sensing pad T are formed on the substrate 410. Therefore, the pixel array 400 of the present embodiment is initially formed. The transparent conductive layer B1 crosses the sub-pixel regions S2 and S4 and is electrically connected to the active layer 424 through the contact window 464b. The transparent conductive layer B1, the first capacitor electrode 444a and the active layer 424 together form a storage capacitor C1. The transparent conductive layer B2 crosses the sub-pixel regions S1, S3 and S4 and is electrically connected to the active layer 426 through the contact window 466b. The transparent conductive layer B2, the first capacitor electrode 444b and the active layer 426 together form a storage capacitor C2. The transparent conductive layer B3 crosses over the sub-pixel regions S1, S2 and S4 and is electrically connected to the active layer 428 through the contact window 468b. The transparent conductive layer B3, the first capacitor electrode 444c and the active layer 428 together form a storage capacitor C3. The touch sensing pad T is disposed in the sub-pixel region S1 and is electrically connected to the active layer 422 through the contact window 462b.

In the present embodiment, the storage capacitor C2 is located in the sub-pixel region S1, the storage capacitor C1 is located at the periphery of the sub-pixel region S1, and the storage capacitor C3 crosses the sub-pixel regions S1 and S2. Accordingly, in the present embodiment, the storage capacitors C1, C2 and C3 are concentrically disposed in the sub-pixel region S1 or at the periphery of the sub-pixel region S1.

It should be noticed that, in the present embodiment, the transparent conductive layer B1 is shielded by the common line 442 and the scan lines 430, the transparent conductive layer B2 is shielded by the data lines 470 and the touch sensing data transmission line 480. Further, each of the areas of the transparent conductive layers B1 and B2 is larger than the area of the transparent conductive layer B3. Hence, the areas of the transparent layers B1 and B2 used for displaying the image (i.e. the area of the region without being shielded by the common line 442, the scan lines 430 or data lines 470, the touch sensing data transmission line 480, the storage capacitors C1 and C2) can be substantially equal to the area of the transparent conductive layer B3 used for displaying the image. In other words, in the present embodiment, the increasing of the areas of the transparent conductive layers B1 and B2 are used to compensate the shielded areas of the transparent conductive layers B1 and B2 shielded by the common line 442, the scan lines 430, the data lines 470 and the touch sensing data transmission line 480 so that the display areas of the transparent conductive layers B1, B2 and B3 are substantially equal to one another.

In the present embodiment, when the pixel array 400 is applied to the touch panel (not shown), the aperture ratio of the touch panel is increased for about 26%. Therefore, the pixel array 400 applied to the touch panel can increase the aperture ratio of the touch panel.

According to the above description, at least a portion of the storage capacitors in the same pixel is concentrically disposed in one sub-pixel region in the pixel region, and the pixel electrodes are disposed in other sub-pixel regions in the pixel region. Thus, the pixel electrodes can be prevented from being shielded by the first capacitor electrodes (the capacitor bottom electrode) of the storage capacitors and the black matrix which is used to shield the storage capacitors. Thus, the aperture ratio can be increased. Moreover, since the storage capacitors of the present invention can be concentrically disposed in one sub-pixel region of the pixel region or at the periphery thereof, the length of the joint portion between the storage capacitors and the pixel electrodes can be greatly decreased. Hence, the area of the black matrix is decreased and the aperture ratio is increased. Further, the common line of the present invention is only distributed in portions of the sub-pixel regions of each of the pixel region, which is different from the conventional common line distributed in each sub-pixel region of each pixel region. Hence, in the present invention, the number of the pixel electrode shielded by the common line is small and the total shielded area of the pixel electrodes is small. Thus, the aperture ratio is increased.

Although the invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pixel array, comprising:
a plurality of scan lines;
a plurality of data lines intersected with the scan lines to define a plurality of sub-pixel regions arranged in an array;
a plurality of pixels, wherein each of the pixels is disposed in a pixel region, and the pixel region is composed of m×n sub-pixel regions, wherein m is a positive integral and n is a positive integral larger than one, and each of the pixels comprises a plurality of sub-pixels, and each of the sub-pixels comprises an active device, a pixel electrode and a storage capacitor, and the storage capacitors of two or more of the sub-pixels in the same pixel are concentrically disposed in one of the sub-pixel regions; and
a plurality of common lines, wherein the common lines are electrically connected to the storage capacitors, and the common lines are distributed within a portion of the sub-pixel regions, wherein each of the storage capacitors comprises:
a first capacitor electrode connected to one of the common lines; and
a second capacitor electrode disposed over the first capacitor electrode, wherein the second capacitor electrode is connected to one of the pixel electrodes, the second capacitor electrode extends from another one of the sub-pixel regions to the one of sub-pixel regions where the storage capacitors of two or more of the sub-pixels are concentrically disposed.

2. The pixel array of claim 1, wherein each of the pixels further comprises a touch sensing device, and the touch sensing device and the storage capacitors in the same pixel are concentrically disposed in one of the sub-pixel regions.

3. The pixel array of claim 2, wherein areas of the sub-pixel regions are not identical to each other.

4. The pixel array of claim 1, wherein areas of the sub-pixel regions are substantially equal to each other.

5. The pixel array of claim 1, wherein the storage capacitors and the active devices in the same pixel are concentrically disposed in one of the sub-pixel regions.

6. The pixel array of claim 5, wherein areas of the sub-pixel regions are substantially equal to each other.

7. The pixel array of claim 1, wherein the sub-pixel regions in the same pixel region are arranged to be a (m×n) checkerboard arrangement.

8. The pixel array of claim 1, wherein m is equal to n and is equal to two.

9. The pixel array of claim 1, wherein the sub-pixel regions configured with the storage capacitors are reflective regions or black matrix shielding regions.

10. The pixel array of claim 1, wherein the storage capacitors of the two or more of the sub-pixels in the same pixel are exclusively disposed in one of the sub-pixel regions.

11. A pixel array, comprising:
a substrate;
two scan lines disposed on the substrate;
two data lines disposed on the substrate and intersected with the scan lines to define 2×2 sub-pixel regions;
a first sub-pixel and a second sub-pixel disposed in the sub-pixel regions, wherein the first sub-pixel comprises a first storage capacitor, and the second sub-pixel comprises a second storage capacitor, and the first storage capacitor and the second storage capacitor are concentrically disposed in one of the sub-pixel regions or at the periphery of the sub-pixel region, and wherein the first sub-pixel further comprises a first active device, the second sub-pixel further comprises a second active device, and the first and second storage capacitors and the first and second active devices are concentrically disposed in one of the sub-pixel regions.

12. The pixel array of claim 11, further comprising a third sub-pixel disposed in the sub-pixel regions, wherein the third sub-pixel comprises a third storage capacitor, and the first storage capacitor, the second storage capacitor and the third storage capacitor are concentrically disposed in one of the sub-pixel regions or at the periphery of the sub-pixel region.

13. The pixel array of claim 11, further comprising a touch sensing device, wherein the touch sensing device, the first storage capacitor and the second storage capacitor are concentrically disposed in one of the sub-pixel regions.

14. The pixel array of claim 11, further comprising a common line, wherein the common lines are electrically connected to the first and second storage capacitors and the common line are distributed within a portion of the sub-pixel regions.

15. The pixel array of claim 11, wherein the sub-pixel regions configured with the first and second storage capacitors are reflective regions or black matrix shielding regions.

* * * * *